(12) United States Patent
Loth-Krausser

(10) Patent No.: US 6,188,142 B1
(45) Date of Patent: Feb. 13, 2001

(54) METHOD AND ARRANGEMENT FOR DISCONNECTING CONSUMERS

(75) Inventor: Hartmut Loth-Krausser, Stockstadt am Rhein (DE)

(73) Assignee: Braun GmbH (DE)

(*) Notice: Under 35 U.S.C. 154(b), the term of this patent shall be extended for 0 days.

(21) Appl. No.: 09/254,313

(22) PCT Filed: Aug. 27, 1997

(86) PCT No.: PCT/EP97/04664

§ 371 Date: Mar. 4, 1999

§ 102(e) Date: Mar. 4, 1999

(87) PCT Pub. No.: WO98/11644

PCT Pub. Date: Mar. 19, 1998

(30) Foreign Application Priority Data

Sep. 14, 1996 (DE) .............................. 196 37 574

(51) Int. Cl.$^7$ .................................................. H01H 35/00
(52) U.S. Cl. ............................................. 307/38; 320/134
(58) Field of Search .......................... 361/154; 307/38, 307/64, 66, 10.7, 130; 320/151, 152, 159, 134; 323/906

(56) References Cited

U.S. PATENT DOCUMENTS

| | | |
|---|---|---|
| 4,322,634 | 3/1982 | Kaire et al. . |
| 4,703,247 | 10/1987 | Moroika . |
| 4,949,215 * | 8/1990 | Studtmann et al. .............. 361/154 |
| 5,204,992 | 4/1993 | Carpenter . |
| 5,343,137 | 8/1994 | Kitaoka et al. . |
| 5,804,894 * | 9/1998 | Leeson et al. ................. 307/130 |
| 6,040,682 * | 3/2000 | Kaneda ........................ 320/136 |

FOREIGN PATENT DOCUMENTS

| | | |
|---|---|---|
| 36 11 484 A1 | 10/1987 | (DE) . |
| 41 16 318 A1 | 11/1992 | (DE) . |
| 41 31 981 A1 | 4/1993 | (DE) . |
| 42 41 066 C1 | 1/1994 | (DE) . |
| 44 29 101 A1 | 2/1995 | (DE) . |
| 0 240 883 | 10/1987 | (EP) . |

OTHER PUBLICATIONS

"Battery Fail–Safe Mechanism for Personal Computer", IBM Technical Bulletin, vol. 33, No. 10A Mar. 1991, pp. 440–442.

* cited by examiner

Primary Examiner—Josie Ballato
Assistant Examiner—Robert L. DeBeradinis
(74) Attorney, Agent, or Firm—Fish & Richardson P.C.

(57) ABSTRACT

The invention concerns a method and arrangement for disconnecting consumers who are connected to a voltage source, specially a direct voltage source. For the purposes of the present invention direct voltage systems are, for instance, the well-known mobile equipment driven by solar cells, primary or secondary batteries. The present invention is based on the knowledge that several consumers are often present in a voltage system, apart of which can be disconnected immediately when one or several conditions for disconnection are fulfilled, while another part of the consumers should be gradually disconnected due to technical safety reasons or psychological aspects. According to the invention consumers connected to a voltage source can be disconnected in two steps, that is, the power passing through the consumers is reduced, for which a slow regulation is offered, and later the power passing through the rest of the users is disconnected. The invention also concerns a circuitry to carry out the invented method, which has a controllable resistance element (M2) to disconnect least one first consumer (V) and a controllable connecting element (M1) to distconnect at least one further consumer (V1), which are controlled by a regulating circuit. The regulating circuit is designed in such a way that it is only after the power is flowing through the first consumer (V) that the power of the other consumer (V1) can be disconnected.

24 Claims, 2 Drawing Sheets

METHOD AND ARRANGEMENT FOR DISCONNECTING CONSUMERS

METHOD AND ARRANGEMENT FOR DISCONNECTING LOADS

Figure 1:
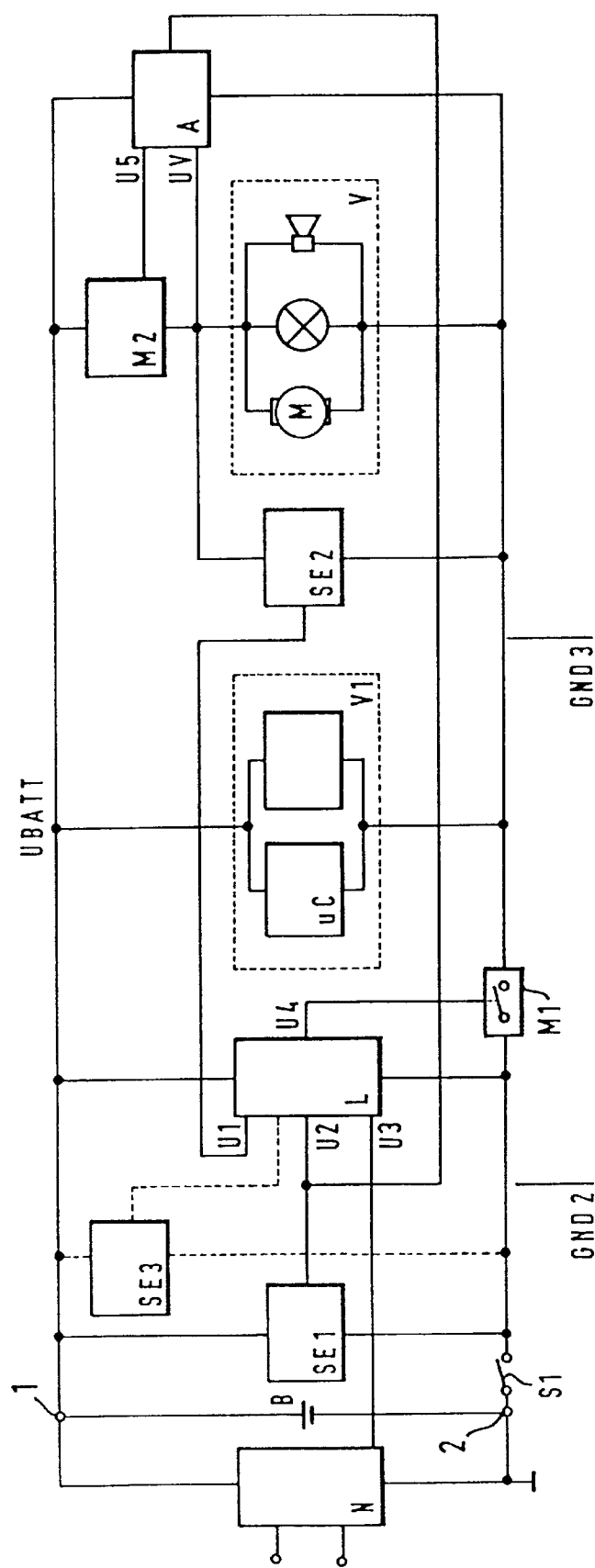

This invention relates to a method and an arrangement for disconnecting loads connected to a voltage source, for example, a direct-current voltage source. For the purposes of the present invention, loads are in particular power consuming devices which are contained in usually mobile apparatus known in the art and powered by solar cells, primary or secondary batteries and which include, for example, electronic circuits, motors, microprocessors or the like.

From DE 41 31 981 A1 and DE 42 41 066 A1 circuit configurations are known in which a voltage discriminator determines the voltage of a battery. After the voltage has achieved a pre-determined value, current flow through a load connected to the battery is reduced to zero value continuously or in steps by means of a control circuitry. However, in these circuit configurations only the load on the battery caused by the device consuming the greatest share of the current is reduced. Other system components as, for example, the control circuitry itself, continue to deplete the battery, though at a slower rate.

From DE 41 16 318 A1 a circuit configuration for protecting a storage battery from deep discharges is known, having an electronic switching device which disconnects the connected load from the storage battery when the storage battery's voltage drops to a value below a definable threshold value.

Hence, in the circuit configurations known in the art, the connected loads are either disconnected from the battery instantly or the supply of power is adjusted downward within a predetermined period of time when the battery voltage decreases as discharging of the battery is proceeding, thereby avoiding deep discharging of the battery. This is of importance in particular in the use of lithium secondary batteries to prevent damage to the battery.

The present invention is based on the realization that an electrical apparatus frequently has different loads some of which can be disconnected instantly when one or several shutdown conditions are met, whilst for some other loads it is desirable that the supply of power be adjusted downward at a slow rate for safety or psychological reasons.

By way of example an electrical household appliance is referred to, in particular a battery-powered shaver, which has a motor whose power needs to be reduced slowly when a shutdown condition is satisfied in order to prevent beard hairs from being pinched painfully. By contrast, for example, a micro-controller or a measuring circuit can be turned off instantly.

However, also in systems which normally would permit an instant shutdown, a gradual reduction in the intensity of perceivable function indicators as, for example, the intensity of light or sound, is apt to indicate to the user that the secondary battery is discharged, whereas, by contrast, an abrupt abortion of the function could suggest a defect.

According to the method indicated in claim 1 of the present invention, loads connected to a voltage source are disconnected from the voltage source in two steps after at least one shutdown condition is met, the first step involving a reduction in the current supplied to those loads for which a slow downward adjustment is appropriate, and the subsequent step involving disconnection of the remaining loads.

Because the various loads are disconnected successively in time, particularly those systems that are needed for effecting the slow downward adjustment of the power supplied to the loads continue to be operable until the process of downward adjustment is completed. Then these systems are turned off as well.

According to present invention, the current supplied to the loads to be subjected to the downward adjustment is reduced to a presettable value, for example, zero value. By the subsequent shutdown of the loads to be disconnected, preferably the loads that already have been subjected to the downward adjustment are also disconnected from the voltage source. This is necessary particularly in cases in which the presettable value referred to above is unequal to zero.

In cases in which the shutdown condition is defined by the magnitude of the voltage of a voltage source, it is particularly advantageous to use voltage sensors with a digital output so that the sensors' output signal changes from a LOW to a HIGH level or vice versa in the presence of a selectable threshold value. This makes it possible, by selection of the threshold value, to adapt the circuit arrangement of the present invention to the voltages of a wide variety of voltage sources including, for example, any type of battery Dr solar cell.

However, the shutdown condition is also determinable by the temperature or other measured quantities as, for example, speed, current, brightness or sound, which are detected by appropriate sensors.

According to the present invention, the process of downward adjustment of a load needing to be subjected to downward adjustment does not start until the output signal of a first voltage sensor detects that the voltage UBATT supplied by the voltage source has fallen below a predetermined threshold value UBATTmin or until some other shutdown condition has occurred. In a solar cell, for example, this is the case when dusk sets in, and in a secondary battery when discharging continues progressively. The process of downward adjustment is considered completed when a second voltage sensor detects that the supply voltage UV residing at the loads to be subjected to the downward adjustment has dropped below a predetermined threshold value UVmin, or when a prescribed period of time has expired which is assumed to be of a duration sufficiently long to execute the downward adjustment. Only after these conditions are satisfied are the loads allowing instant shutdown and, for safety reasons, preferably also the loads that are already downward adjusted, disconnected from the voltage source.

When the voltage of the voltage source rises again above this threshold value UBATTmin or some other threshold value UBATTmin', current supply to the loads is resumed. The increase in voltage can be due to, for example, the replacement or recharging of the secondary battery or the connection of a power supply.

With the power supply appropriately designed, the loads can be operated in the two-way mode in a manner known in the art, meaning that power is supplied to the loads from the power supply and, if applicable, the secondary batteries are recharged. This makes it possible to operate the loads also in the event of a depleted secondary battery.

Figure 2:
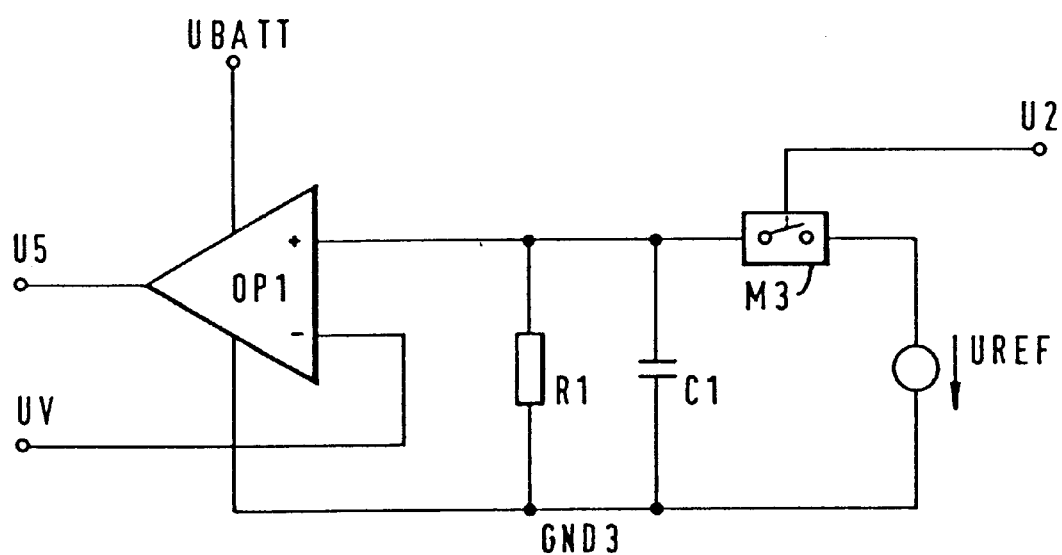

An embodiment of the present invention will be described in the following with reference to the accompanying drawings illustrating a circuit arrangement for disconnecting loads connected to a voltage source. Further embodiments are dealt with in the description. In the drawings, FIG. 1 is a block diagram of a circuit arrangement of the present invention; and FIG. 2 is a configuration of the downward adjustment circuit of FIG. 1.

The circuit arrangement of the present invention comprises a first voltage sensor SE1, a second voltage sensor SE2, a controllable switching device M1, a controllable resistor device M2 and a control circuitry which includes a combinational logic system L and a downward adjustment circuit A. The circuit arrangement has a connection terminal 1 which is connected to the positive pole of a secondary battery B, and a chassis terminal 2 which is connected to the negative pole of the secondary battery B. A mechanical switch S1 connects the chassis terminal 2 to a ground wire section GND2. The first voltage sensor SE1 has its supply voltage and at the same time sensor connections connected between a supply voltage line connected to the terminal 1 and the ground wire section GND2. The combinational logic system L has its supply voltage connections likewise connected between the supply voltage line and the ground wire section GND2. The controllable switching device M1 is located between the ground wire section GND2 and a further ground wire section GND3 and has a control input adapted to receive an output signal U4 from the combinational logic system L. A series circuit comprised of the controllable resistor device M2 and first loads V is connected between the supply voltage line and the further ground wire section GND3. Connected in parallel arrangement thereto are further loads V1 and the supply voltage connections of the downward adjustment circuit A. The second voltage sensor SE2 has its supply voltage and sensor connections connected in parallel to the first loads V.

The outputs of the first voltage sensor SE1, the second voltage sensor SE2 and, where applicable, of further sensors SE3 are connected to corresponding inputs of the combinational logic system L. The output of the first voltage sensor SE1 is further connected to a first input of the downward adjustment circuit A. The downward adjustment circuit A has a second input connected to the junction of the controllable resistor device M2 and the first loads V. The control output of the downward adjustment circuit A is connected to the control input of the controllable resistor device M2.

The function of the circuit arrangement of the present invention will be described in the following, proceeding from the assumption that the secondary battery B is in charged condition.

To activate the system the mechanical switch S1 is closed. The first voltage sensor SE1 then delivers an output signal U2 which becomes a HIGH level signal thereby indicating that the secondary battery voltage UBATT lies above a cutoff voltage It UBATTmin. The second voltage sensor SE2 supplies an output signal U1 which becomes a LOW level signal thereby indicating that the supply voltage UV of the first loads V is below a threshold value UVmin. The output signals U2 and U1 of the first and, respectively, second voltage sensor reside at the corresponding inputs of the combinational logic system L which, in the presence of these conditions, delivers a HIGH level output signal U4 which is supplied to the controllable switching device M1. As a result, the controllable switching device M1 operates to connect the ground wire section GND2 to the further ground wire section GND3, so that voltage is supplied by the secondary battery B to the further loads V1, the downward adjustment circuit A and the second voltage sensor SE2. The output signal U2 of the first voltage sensor SE1 which is applied to the first input of the downward adjustment circuit A and becomes a HIGH level signal has the effect of causing the downward adjustment circuit A to enable the controllable resistor device M2, so that also the first loads V are supplied with voltage through the controllable resistor device M2. The supply voltage UV of the first loads V then practically corresponds to the supply voltage UBATT of the secondary battery B, accordingly lying above a threshold value UVrnin. Therefore the second voltage sensor SE2 delivers an output: signal U1 which becomes a HIGH level signal. The system is now in a condition ready for operation.

With the service period increasing, the secondary battery voltage UBATT decreases, reaching the cutoff voltage UBATTmin. Thereupon the output signal U2 of the first voltage sensor SE1 goes from a HIGH to a LOW level. The downward adjustment circuit A then reduces the supply voltage UV of the first loads V in accordance with a defined time schedule by controlling the controllable resistor device M2 in dependence on time in such fashion that its resistance value increases as a function of time. As a result, the supply voltage UV of the first loads V diminishes down to a threshold value UVmin. When this threshold value UVmin is reached, the output voltage of the second voltage sensor SE2 goes from a HIGH to a LOW level. Because both output voltages U1 and U2 of the voltage sensors are now at a LOW level, the output voltage U4 of the combinational logic system L goes also from HIGH to LOW, opening the controllable switching device M1. With the exception of the voltage sensor SE1 and the combinational logic system L, all loads are thereby disconnected from the secondary battery B.

Considering that the first voltage sensor SE1 and the combinational logic system L can be designed so that their supply currents are in the microampere range, discharging of the secondary battery B by the voltage sensor SE1 and the combinational logic system L occurs at such a slow rate that it can normally be expected that the user recharges the secondary battery B in time before deep discharging occurs. However, by actuation of the mechanical switch S1 it is furthermore possible for the first voltage sensor SE1 and the combinational logic system L to be disconnected from the secondary battery B, thereby ensuring that the secondary battery B is protected from deep discharging.

After the secondary battery B is discharged, operation of the system can be resumed by use of a power supply. By actuation of the mechanical switch S1 the loads cannot be operated again until in the meantime a charging power supply has recharged the secondary battery B to a level at which the secondary battery voltage UBATT exceeds the value UBATTmin, and hence until the first voltage sensor SE1 delivers again a HIGH level output signal U2.

In another embodiment of the circuit arrangement of the present invention, the system can be operated solely from an appropriately designed charging power supply N in cases in which the secondary battery is discharged. For this purpose, the combinational logic system L has a further input receiving the output signal U3 of the charging power supply N. As long as the charging power supply N is connected to the line, the output signal of the charging power supply is a HIGH level signal. With the mechanical switch S1 closed, the output signal U4 of the combinational logic system L, is thereby set to a HIGH level again, closing the controllable switching device M1. As a result, the system operates on the current supplied by the charging power supply N. At the same time, the secondary battery B can be recharged. After the secondary battery B is charged to full capacity, the charging power supply N turns itself off. At the same time the output signal U3 of the charging power supply N goes from a HIGH to a LOW level.

As becomes apparent from the foregoing description, the output signal U4 of the combinational logic system L becomes a LOW level, hence opening the controllable switching device M1, only if each of the three signals U1, U2 and U3 goes to LOW. Therefore, the combinational logic system L may be configured as an OR gate. In another configuration of the combinational logic system correspondingly other values can be selected for the signals U1, U2 and U3. As controllable switching device M1 a relay or a MOSFET finds application, for example. The controllable resistor device M2 is preferably a MOSFET.

In a further configuration of the circuit arrangement of the present invention, the switching threshold of the first voltage sensor SE1 is adjustable. This enables the circuit arrangement to be adjusted to different cutoff voltages and it is therefore adaptable to a variety of types of secondary battery, solar cell, etc.

In cases in which the combinational logic system L is modified to include further inputs, these may receive the output signals of further sensors SE3. It is thereby possible to implement further shutdown conditions including, for example, a temperature dependent shutdown preventing a load from overheating.

As illustrated in FIG. 1, power supply to the first loads V is downward adjusted jointly by the downward adjustment circuit A. In a modified circuit arrangement each load needing to be subjected to downward adjustment has a downward adjustment circuit and a controllable resistor device of its own.

In the following, an advantageous configuration of the downward adjustment circuit A illustrated in FIG. 2 will be described. The downward adjustment circuit A includes an operational amplifier OP1 adapted to receive at its inverting input the supply voltage UV of the first loads V. Connected between the non-inverting input of the operational amplifier OP1 and the further ground wire section GND3 is a resistor R1 in parallel arrangement with a capacitor C1 as well as a series circuit comprised of a controllable switching device M3 and a reference voltage source UREF. The controllable switching device M3 has a control input which is connected to the output of the first voltage sensor SE1. The output U5 of the operational amplifier OP1 is connected to the control input of the controllable resistor device M2. The controllable switching device M3 is implemented, for example, by a relay or a MOSFET.

With the system in a condition ready for operation, the controllable switching device M3 is closed, connecting the non-inverting input of the operational amplifier OP1 to the reference voltage source UREF. Hence the supply voltage UV of the first loads V which is present at the inverting input can be adjusted to the voltage of the reference voltage source UREF. When the output signal of the first voltage sensor SE1 goes from a HIGH to a LOW level, the controllable switching device M3 is opened. Capacitor C1 which previously had been charged to the reference voltage with the controllable switching device M3 closed, then discharges through the resistor R1. This produces a reference voltage decreasing with time. In consequence, the output signal U5 equally decreases with time, and the supply voltage UV of the first loads V is correspondingly adjusted down to zero value by the controllable resistor device M2 as discharging of the capacitor C1 proceeds.

In another variant of the downward adjustment circuit, the reference voltage source UREF is omitted. Instead, the secondary battery voltage UBATT is fed directly to the non-inverting input of the operational amplifier OP1 via the controllable switching device M3. This variant finds application in cases in which it is not absolutely necessary for the first loads V to be operated with a controlled supply voltage UV.

In a still further variant, the downward adjustment circuit comprises merely a microcontroller. When the first voltage sensor SE1 starts the downward adjustment process with its output signal U2, the voltage at the output U5 of the microcontroller is reduced in small steps in order to thereby adjust the supply of power to the first loads V downward by means of the controllable resistor device M2.

Additional variants may provide for a downward adjustment of current, speed, brightness or volume, instead of providing for voltage control.

Moreover, in lieu of a downward adjustment circuit a control circuit may be provided which in the presence of a shutdown condition delivers to the controllable resistor device M2 a signal U5 varying with time and which is independent of the supply voltage UV of the first loads V in order to thus reduce the current through the first loads V.

What is claimed is:

1. A method for disconnecting an electrical apparatus including a first load and a second load connected to a voltage source, in which the current supplied by the voltage source is reduced continuously or in steps, the method comprising:

reducing the current supplied by the voltage source to the first load, and subsequently turning off the current supplied by the voltage source to the second load.

2. The method as claimed in claim 1, further comprising maintaining the current supplied to the second load throughout the step of reducing the current supplied to the first load.

3. The method as claimed in claim 2, wherein the current supplied to the first load is reduced to a presettable value.

4. The method as claimed in claim 3 wherein the presettable value is zero.

5. The method as claimed in claim 2, wherein the first load is disconnected simultaneously with the disconnection of the second load.

6. The method as claimed in claim 2, wherein the voltage of the voltage source is determined by a first voltage sensor delivering an output signal, and the supply of current to the first load is reduced when the voltage of the voltage source drops below a threshold value.

7. The method as claimed in claim 6, wherein at least one further sensor is provided which delivers an output signal, and the supply of current to the first load is reduced when the output signal of the further sensor exceeds or falls below a threshold value.

8. The method as claimed in claim 7 wherein the further sensor is a temperature sensor.

9. The method as claimed in claim 6, wherein, following expiration of a prescribed time period after start of the reduction of the supply of current to the first load, the supply of current to the second load is turned off.

10. The method as claimed in claim 6, wherein the voltage across the first load is determined by a second voltage sensor, delivering an output signal, and the supply of current to the second load is turned off when the voltage across the first load falls below a threshold value.

11. A circuit arrangement for disconnecting a load connected to a voltage source, comprising;

a controllable resistor device connected between a first load and a voltage source for reducing the current supplied by the voltage source to the first load, a controllable switching device for disconnecting at least one further load from the voltage source, a control circuit for controlling the controllable switching device, the control circuit being configured such that it is not until after the current flowing through the first load is reduced that the further load can be disconnected by controlling the controllable switching device.

12. The circuit arrangement as claimed in claim 11, wherein the control circuit is configured such that it is not until after the current flowing through the first load is reduced that the first load can be disconnected by controlling the controllable switching device.

13. The circuit arrangement as claimed in claim 11 or 12, wherein the control circuit comprises a combination logic system and a downward adjustment circuit which are adapted to receive an output signal of a first voltage sensor for determining the voltage of the voltage source.

14. The circuit arrangement as claimed in claim 13, wherein the combinational logic system is adapted to receive an output signal of a second voltage sensor for determining the voltage residing at the first load.

15. The circuit arrangement as claimed in claim 11, wherein the voltage source supplies a current to the further load, the voltage source maintaining the current supplied to the further load while the controllable resistor reduces the current supplied by the voltage source to the first load.

16. The circuit arrangement as claimed in claim 15, wherein the control circuit includes a timing circuit that disconnects the loads after a prescribed time period following the beginning of the current reduction.

17. The circuit arrangement as claimed in claim 13, wherein the voltage source is a battery or a direct-current voltage source having at least one solar cell.

18. The circuit arrangement as claimed in claim 17, wherein the combinational logic system is adapted to receive an output signal of a charging power supply for charging a secondary battery.

19. The circuit arrangement as claimed in claim 13, wherein the control circuit is adapted to receive an output signal of at least one further sensor, and the further sensor is a temperature sensor.

20. The circuit arrangement as claimed in claim 13, wherein the controllable resistor device is a MOSFET drivable by the downward adjustment circuit, and the controllable switching device is a MOSFET or a relay drivable by the combinational logic system.

21. The circuit arrangement as claimed in claim 13, wherein the combinational logic system includes an OR gate.

22. The circuit arrangement as claimed in claim 13, to 21, wherein a signal is deliverable to the downward adjustment circuit which signal corresponds to the voltage residing at the first load.

23. The circuit arrangement as claimed in the claim 22, wherein the downward adjustment circuit includes an operational amplifier which is adapted to receive the signal corresponding to the voltage residing at the first load as well as a reference voltage, and whose output signal is deliverable to the controllable resistor device (M2).

24. The circuit arrangement as claimed in claim 23, wherein the downward adjustment circuit includes a controllable switching device which is controllable by the first voltage sensor, and that said controllable switching device is operable to deliver to the operational amplifier, instead of the reference voltage, a varying voltage, in particular the voltage of a capacitor discharging through a resistor.

* * * * *

UNITED STATES PATENT AND TRADEMARK OFFICE
CERTIFICATE OF CORRECTION

PATENT NO.   : 6,188,142 B1
DATED        : February 13, 2001
INVENTOR(S)  : Hartmut Loth-Krausser It is certified that error appears in the above-identified patent and that said Letters Patent is hereby corrected as shown below:

<u>Column 8,</u>
Line 14, delete "to 21".

Signed and Sealed this

Sixteenth Day of April, 2002

*Attest:*

JAMES E. ROGAN
*Director of the United States Patent and Trademark Office*

*Attesting Officer*